US012502676B2

(12) United States Patent
Meyer

(10) Patent No.: US 12,502,676 B2
(45) Date of Patent: Dec. 23, 2025

(54) COOLING FRAGMENTED MATERIAL BEFORE MILLING

(71) Applicant: L'Air Liquide, Société Anonyme pour l'Etude et l'Exploitation des Procédés Georges Claude, Paris (FR)

(72) Inventor: Dirk Meyer, Mönchengladbach (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 476 days.

(21) Appl. No.: 17/987,478

(22) Filed: Nov. 15, 2022

(65) Prior Publication Data

US 2023/0149941 A1 May 18, 2023

(30) Foreign Application Priority Data

Nov. 15, 2021 (EP) .................................... 21208287

(51) Int. Cl.
*B02C 19/18* (2006.01)
*B02C 25/00* (2006.01)

(52) U.S. Cl.
CPC ............ *B02C 19/186* (2013.01); *B02C 25/00* (2013.01)

(58) Field of Classification Search
CPC ... B02C 2019/186; B02C 25/00; B02C 23/18; B02C 23/20; B02C 23/22
USPC ...................................................... 241/23, 65
See application file for complete search history.

(56) References Cited

U.S. PATENT DOCUMENTS 3,614,001 A * 10/1971 Beike .................... B02C 19/186 241/23
3,666,185 A * 5/1972 Williams ............. B02C 19/186 241/23
3,771,729 A * 11/1973 Frable ..................... B29B 13/10 241/23
4,222,527 A * 9/1980 Davis ...................... B02C 25/00 241/DIG. 37

(Continued)

FOREIGN PATENT DOCUMENTS

DE 22 45 804 3/1974
DE 26 33 873 6/1977
DE 100 13 742 9/1999

(Continued)

OTHER PUBLICATIONS

European Search Report and Written Opinion for corresponding EP 21208287, May 6, 2022.

*Primary Examiner* — Christopher L Templeton
*Assistant Examiner* — P Derek Pressley
(74) *Attorney, Agent, or Firm* — Elwood L. Haynes

(57) ABSTRACT

According to the present invention fragmented material 2, e.g. made from a material having Polyamides, is passing through a liquid bath 6 filled with liquid nitrogen 7 to cool the fragmented material 2 before entering a mill 10 for grinding the fragmented material 2. The fragmented material 2 is moved through the liquid bath 6 by exciting mechanical vibrations in the liquid bath 6 e.g. by a vibrational motor 28 coupled to the liquid bath 6 and/or an ultrasonic resonator 26 attached to the liquid bath 6. The invention allows to grind even materials being difficult to grind by reaching a temperature of −150° C. and less before entering the mill 10 while avoiding a direct cooling e.g, by introducing liquid nitrogen directly into the mill 10.

11 Claims, 2 Drawing Sheets

(56) References Cited

U.S. PATENT DOCUMENTS

| | | | |
|---|---|---|---|
| 6,348,797 | B1 | 2/2002 | Shimizu et al. |

FOREIGN PATENT DOCUMENTS

| | | | | |
|---|---|---|---|---|
| DE | 102010012448 | A1 * | 9/2011 | ............. B02C 23/18 |
| DE | 10 2015 100 140 | B3 | 2/2016 | |
| EP | 0919284 | A1 * | 6/1999 | |
| GB | 1 553 211 | | 9/1979 | |

* cited by examiner

COOLING FRAGMENTED MATERIAL BEFORE MILLING

CROSS REFERENCE TO RELATED APPLICATIONS

This application claims the benefit of priority under 35 U.S.C. § 119 (a) and (b) to European Patent Application No. 21208287.9, filed Nov. 15, 2021, the entire contents of which are incorporated herein by reference.

BACKGROUND

The subject matter of the present invention is a method for grinding fragmented material by pre-cooling to low temperatures of e.g. −150° C. and less without applying a liquefied gas to the respective mill.

Miffing or grinding is used to prepare milled material of a defined particle size distribution such as a powder. Milling is frequently used for fragmented materials, i.e. materials being provided in fragments of pieces with certain distributions of particle sizes. Fragmented materials cover both materials having a rather uniform particle size distribution such as powder or pellets and materials having a less uniform particle size distribution such as material being provided in separate pieces of irregular shape and size.

Materials exist that are difficult to grind, such as soft materials, medium-hard, brittle, hart-brittle, fibrous or temperature-sensitive materials. The materials are either not grindable or decrease in quality while grinding e.g. due to the temperature increase generated by the mechanical treatment. For some specific cases solutions are known. E.g. it is known from DE 100 13 742 A1 that for miffing animal and plat parts for use in traditional Chinese medicine it can be advantageous to provide a liquefied gas into the mill while miffing or grinding. This can lead to an uneven cooling of the fragmented material resulting in an uneven particle distribution after milling and to thermal strain on the mill due to the uneven distribution of liquefied gas in the mill.

It is, therefore, an object of the present invention to overcome at least in part the disadvantages known from prior art. This object is solved by the features of the independent claims. Dependent claims are directed to preferred embodiments of the present invention.

The method for grinding fragmented material according to the present invention comprises:

providing an amount of the fragmented material at a material inlet to a liquid bath of liquid nitrogen, transporting the fragmented material from the material inlet to a material outlet of the liquid bath by exciting mechanical vibrations in the liquid bath, directly guiding fragmented material from the material outlet to a mill via a chute; and grinding the fragmented material in the mill to a grinded material.

The term fragmented material is understood to cover materials having a uniform distribution of particle sizes, such as powder or pellets and materials having a non-uniform distribution of particles sizes, such as a material provided in pieces having irregular forms and sizes. Furthermore, the material is preferably a material being difficult to grind at usual conditions, in particular at temperatures of −120° C. and warmer. In particular, these materials comprise plastic materials such as Polyamide, thermoplastic materials, ferritic metals, ferritic-martensitic metals, iron based cast alloys, tin and/or zinc. Preferred are fragmented materials made from a material comprising at least one polyamide.

The term liquid bath is understood as a basin which is partly filled with liquid nitrogen. The liquid bath preferably is inclined towards a horizontal plane, preferably with an angle of at most +/−45° with the material inlet being positioned higher (with respect to the horizontal plane) than the material outlet to facilitate the transport through the liquid bath from the material inlet to the material outlet. Nonetheless, it is likewise possible to transport the fragmented material through the liquid bath if the liquid bath is level with the horizontal plane. The term horizontal plane is to be understood as a plane being perpendicular to the gravity force.

The excitation of mechanical vibrations can be performed e.g. by stimulating mechanical vibrations of the whole liquid bath e.g. by inducing rhythmic movements of the whole liquid bath, e.g, by using a vibrating table on which the liquid bath is mounted. Alternatively, ultrasonic excitation can be used to introduce ultrasonic waves in the liquid nitrogen. The fragmented materials are disposed at the bottom of the liquid bath.

The term directly guiding fragmented material from the material outlet to a mill via a chute is to be understood that in particular no dosing means is situated between the material outlet and the mill. This means, that all fragmented material passing the material outlet will directly enter the mill, only delayed by the time of travel in the chute.

As a mill basically any mill suitable to grind the fragmented material after cooling can be used. Preferred are, nonetheless, the following mills Pin mills, wide chamber mills, cutting mills, Fitzmill systems and/or hammer mills.

Preferably, the temperature of the liquid nitrogen and the speed of transport through the liquid bath from the material inlet to the material outlet is controlled such that the temperature of the fragmented material when passing the material outlet is below −150° C., in particular below −170° C. or even below −180° C.

SUMMARY

The present invention allows to provide the fragmented material to the mill with a temperature of −150° C. and lower, depending on the speed of transport through the liquid bath while ensuring a uniform cooling due to the immersion of the fragmented material in the liquid nitrogen. At the same time the direct application of liquid nitrogen to the mill can be avoided reducing the thermal stress of the mill. This means the fragmented material entering the mill is having a homogeneous temperature. By this method materials can be milled that are not or not satisfactorily grindable at higher temperatures.

In particular the present invention can be used to mill crude materials to be used in an added manufacturing process. The crude materials used in added manufacturing process have high demands regarding a uniform particle size distribution to ensure a constant quality in the product produced by added manufacturing. If, for example, Polyamide or a Polyamide comprising material is used for added manufacturing, prior art approaches do not allow an acceptable grinding as the material, which is thermoplastic, keeps its plasticity down to temperatures of −70° C. and below. The current approach allows the preparation of milled material from polyamide comprising materials with a high homogeneity of the particle distribution and allows a continuous quality of the parts manufactured by added manufacturing from these materials.

Preferably, the refill of the liquid nitrogen to the liquid bath is controlled to maintain a predetermined filling level at a predetermined position in the liquid bath. The level is measured at a predetermined position in the bath and is controlled to be constant at this position. For a level liquid bath the same level is constant throughout the liquid bath whereas for an inclined liquid bath the level varies based on the inclination angle. The control of the amount of liquid nitrogen to the liquid bath based on the level of the liquid nitrogen allows an easy control and ensures that by adjusting the level relative to the material outlet that no liquid nitrogen enters the chute and, subsequently, the mill.

Preferably, the speed by which the fragmented material is transported from the material inlet to the material outlet is adjusted by at least one of the following measures:

a) adjusting the frequency of the vibrations;

b) adjusting the amplitude of the vibrations; and c) adjusting the incline of the liquid bath with respect to a horizontal plane being perpendicular to the gravity force.

By increasing the frequency and/or the amplitude of the vibrations the speed is increased while by a reduction of the frequency and/or the amplitude of the vibrations the speed is lowered. The incline is preferably defined such that, with respect to the horizontal plane, the material inlet is positioned higher than the material outlet. The inclination can be defined by an inclination angle. By increasing the inclination angle the speed is increased while by a reduction of the inclination angle the speed is reduced. The measures a) to c) and in particular a) and b) allow an easy adjustment of the speed by which the fragmented material is transported from the material inlet to the material outlet. With this it is possible to control the amount of fragmented material provided to the mill after cooling without using a specific dosing hardware such as a star valve.

Preferably, the speed is controlled based on the temperature of the fragmented material moving out of the liquid bath at the material outlet or the temperature of the grinded material when exiting the mill as a control variable. The temperature of the fragmented material moving out of the liquid bath is measurable e.g. by measuring the temperature in the chute while the temperature of the fragmented material exiting the mill can be easily measured at the exit zone of the mill. Preferably, the speed is controlled based on the temperature in the chute.

Preferably, the liquid nitrogen is subcooled before being provided to the liquid bath. This allows to further lower the temperature of the fragmented material when entering the mill. Furthermore, it allows to reduce the length of the liquid bath, i.e, the distance between the material inlet and the material outlet, while reaching a similar temperature of the fragmented material exiting the liquid bath at the material outlet, compared to a longer liquid bath filled with liquid nitrogen which is not subcooled while using the same speed of transport.

Preferably, the fragmented material is provided to the liquid bath by a dosing means and a star valve. The dosing means allows to control and meter the amount of fragmented material provided to the liquid bath and, subsequently, to the mill. The star valve prevents the leakage of nitrogen gas from atmosphere above the liquid nitrogen in the liquid bath.

Preferably, the mechanical vibrations are generated using a mechanical vibration motor.

Preferably, the mechanical vibrations are ultrasonic vibrations. Using ultrasonic vibrations, preferably generated by an ultrasonic resonator, i.e. ultrasonic waves in the liquid bath are easily applicable. Furthermore, the control of the ultrasonic excitation regarding its frequency and/or amplitude is easily possible allowing an easy adjustment of the speed of transport of the fragmented material from the material inlet to the material outlet.

Preferably, evaporated liquid nitrogen is sucked off from the chute. This reduces the ingress of evaporated liquid nitrogen into the mill avoiding that the temperature of the mill gets too cold. This reduces icing of the mill and reduces the thermal strain on any thermoplastic parts of the mill such as bearings and/or dampers.

According to a further aspect off the invention an installation for grinding fragmented material is proposed, comprising a liquid bath being providable with liquid nitrogen having a material inlet at a first end through which fragmented material is providable into the liquid bath and a material outlet at a second end opposite the first end trough which fragmented material is providable to a chute directly connected to a mill for grinding the fragmented material, further comprising mechanical excitation means for mechanically exciting the liquid bath. Preferably, the installation is operated according to the method of the present invention.

Preferably, the installation further comprises a control device by which at least one of the following parameters is adjustable:

a) the excitation frequency of the mechanical excitation means;

b) the excitation amplitude of the mechanical excitation means; and c) the incline of the liquid bath with respect to a horizontal plane being perpendicular to the gravity force.

Thus, the control device can control the speed of transport of the fragmented material from the material inlet to the material outlet by adjusting at least one of the parameters a) to c).

Preferably, the installation further comprises at least one of the following sensors:

a) a first temperature sensor measuring the temperature in the chute; and b) a second temperature sensor measuring the temperature in an exit zone of the mill, wherein the at least one temperature sensor is connected to the control device.

This allows the control device to control the speed of transport based on a temperature measured by one of the mentioned temperature sensors.

Preferably, the installation further comprises a subcooler for subcooling the liquid nitrogen. The subcooler allows to reduce the temperature of the liquid nitrogen below the standard boiling temperature of −196° C.

Preferably, the installation further comprises a dosing system and a star valve by which predeterminable amounts of fragmented material are providable to the liquid bath, Preferably, the mechanical excitation means comprise an ultrasonic resonator. In particular, the ultrasonic resonator is coupled to at least one wall or floor of the liquid bath allowing the direct excitation of ultrasonic waves in the liquid nitrogen in the liquid bath.

The details and features discussed for the method according to the present invention can be transferred to the installation according to the present invention. The advantages realized by the method according to the present invention are realized by the installation according to the present invention as well.

BRIEF DESCRIPTION OF THE DRAWINGS

It should be noted that the individual features specified in the claims may be combined with one another in any desired technologically reasonable manner and form further embodiments of the invention. The specification, in particular taken together with the figures, explains the invention further and specifies particularly preferred embodiments of the invention. Particularly preferred variants of the invention and the technical field will now be explained in more detail with reference to the enclosed figures. It should be noted that the exemplary embodiment shown in the figures is not intended to restrict the invention. The figures are schematic and may not be to scale. The figures display:

DETAILED DESCRIPTION OF PREFERRED EMBODIMENTS

Figure 1:
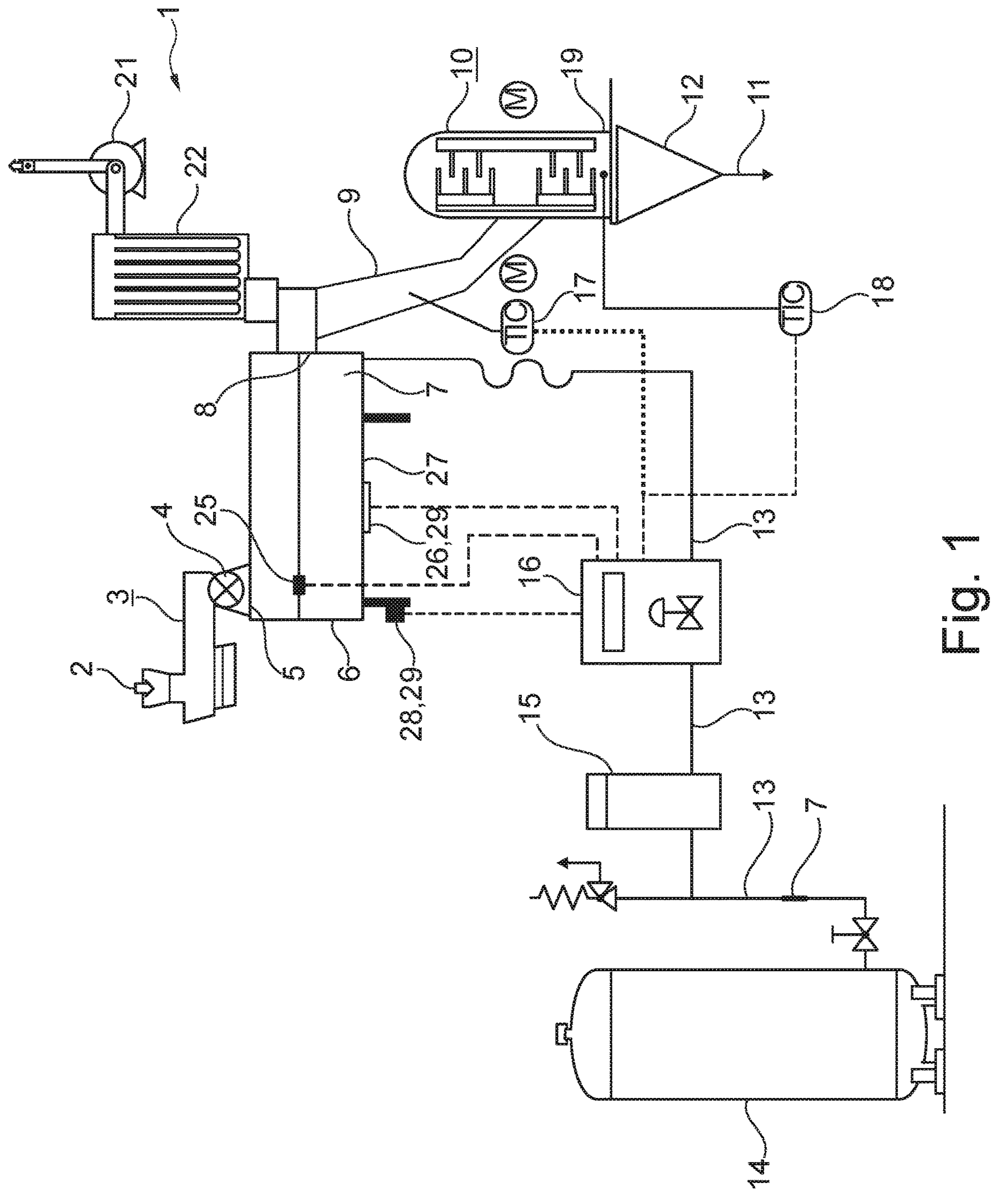
FIG. 1 an example of an installation for grinding fragmented material.

FIG. 1 displays schematically an installation 1 for grinding fragmented material 2. The term fragmented material 2 in the context of this document is to be understood as comprising fragmented material 2 with a particle diameter of up to several centimeters. The term fragmented material 2 comprises both materials having a narrow distribution of dimensions (e.g. being regularly shaped) such as pellets and powder and materials having a broader distribution of dimensions (e.g. being irregularly shaped).

The fragmented material 2 is introduced into a dosing system 3 and through a star valve 4 into the liquid bath 6. By this dosing system 3 the amount of fragmented material 2 being provided to a material inlet 5 of a liquid bath 6 filled with liquid nitrogen 7 can be controlled. The fragmented material 2 enters the liquid nitrogen 7 and is transported in the liquid bath 6 to a material outlet 8 of the liquid bath 6 by exciting mechanical vibrations in the liquid bath 6 and, consequently, in the liquid nitrogen 7. In this example the liquid bath 6 comprises mechanical excitation means 29, i.e, an ultrasonic resonator 26 which excites ultrasonic waves in the liquid nitrogen 7. The ultrasonic resonator 26 is provided at or in a floor 27 of the liquid bath 6. Alternatively or cumulatively, the liquid bath 6 is provided with a vibration motor 28 as mechanical excitation means 29 to excite the mechanical vibrations in the liquid bath 6.

At the material outlet 8 the cooled fragmented material 2 leaves the liquid bath 6 and enters a chute 9 which directly delivers the cooled fragmented material 2 into a mill 10. The term direct delivery is understood such that no means for controlling the amount of fragmented material 2 entering the mill 10 is provided downstream the liquid bath 6, in particular, no star valve is provided between the material outlet 8 and the mill 10. In the mill 10 the cooled fragmented material 2 is grinded to grinded material 11 that can be withdrawn from a grinded material outlet 12.

The liquid nitrogen 7 is provided to the liquid bath 6 via a supply line 13 being connected to a reservoir 14 of liquid nitrogen. The liquid nitrogen 7 extracted from the liquid space of the reservoir 14 having a temperature of −196° C. is provided to a subcooler 15 in which the liquid nitrogen 7 is subcooled, i.e. its temperature is further reduced. The flow of liquid nitrogen 7 downstream of the subcooler 15 is controlled by a control device 16. The flow of nitrogen is controlled by the control device 16 based on the data of a level controller 25 in the liquid bath 6 to maintain a predetermined level of liquid nitrogen 7 in the liquid bath 6. This level 7 is predetermined in such a way that no liquid nitrogen 7 enters the chute 9. As a security measure the temperature in the chute 9 can be measured to detect a situation in which liquid nitrogen 7 enters the chute 9 resulting in a drop of temperature on a very brief timescale.

The level controller 25 is preferably a temperature sensor, an ultrasonic level sensor or a temperature switch. The position of the level controller 25 is adaptable to the level being necessary to cool the specific fragmented material 2 to be milled.

Figure 2:
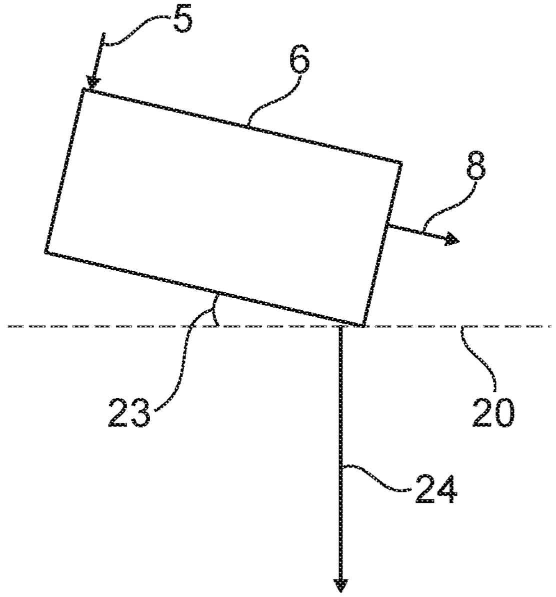
FIG. 2 a schematical drawing of a liquid bath.

The control device receives data of a first temperature sensor 17 measuring the temperature in the chute 9 and/or the data of a second temperature sensor 18 measuring the temperature in an exit zone 19 of the mill 10. The temperature measured by the first temperature sensor 17 and/or the second temperature sensor 18 is used as a control variable in the control device 16 to control the speed of transport of the fragmented material 2 in the liquid bath 6. The speed is adjusted by adjusting the frequency and/or the amplitude of the mechanical vibrations excited in the liquid bath by controlling the ultrasonic resonator accordingly. Additionally, or instead, an inclination angle 23 can be adjusted by the control device 16 as will be described with reference to FIG. 2 in the following. FIG. 2 schematically displays the liquid bath 6 which is inclined by an inclination angle 23 with respect to a horizontal plane 20 which is perpendicular to a gravity force 24.

Evaporated liquid nitrogen 7 is sucked off by a fan 21 through a filter unit 22. The fan 21 is connected to the chute 9 between the material outlet 8 of the liquid bath 6 and the mill 10. The suction of the evaporated liquid nitrogen reduces the amount of evaporated liquid nitrogen 7 entering the mill 10. This avoids the cooling of the mill 10 by this evaporated liquid nitrogen 7 reducing the risk of ice formation in the mill 10. Furthermore, due to the higher temperature of the mill 10 the bearings of the mill 10 are protected from turning too cold avoiding thermal embrittlement of the bearings.

According to the present invention fragmented material 2, e.g, made from a material comprising Polyamides, is passing through a liquid bath 6 filled with liquid nitrogen 7 to cool the fragmented material 2 before entering a mill 10 for grinding the fragmented material 2. The fragmented material 2 is moved through the liquid bath 6 by exciting mechanical vibrations in the liquid bath 6 e.g. by a vibrational motor 28 coupled to the liquid bath 6 and/or an ultrasonic resonator 26 attached to the liquid bath 6. The invention allows to grind even materials being difficult to grind by reaching a temperature of −150° C. and less before entering the mill 10 while avoiding a direct cooling e.g. by introducing liquid nitrogen directly into the mill 10.

REFERENCE NUMERALS

1 installation for grinding fragmented material
2 fragmented material
3 dosing system
4 star valve
5 material inlet
6 liquid bath
7 liquid nitrogen
8 material outlet
9 chute
10 mill
11 grinded material
12 grinded material outlet
13 supply line
14 reservoir
15 subcooler
16 control device

17 first temperature sensor
18 second temperature sensor
19 exit zone
20 horizontal plane
21 fan
22 filter unit
23 inclination angle
24 gravity force
25 level controller
26 ultrasonic resonator
27 floor
28 vibration motor
29 mechanical excitation means

What is claimed is:

1. A method for grinding fragmented material, comprising:

providing an amount of the fragmented material at a material inlet to a liquid bath of liquid nitrogen, transporting the fragmented material from the material inlet to a material outlet of the liquid bath by exciting mechanical vibrations in the liquid bath, directly guiding fragmented material from the material outlet to a mill via a chute; and grinding the fragmented material in the mill to a grinded material, wherein the mechanical vibrations are ultrasonic vibrations.

2. The method according to claim 1, wherein refill of the liquid nitrogen to the liquid bath is controlled to maintain a predetermined filling level at a predetermined position in the liquid bath.

3. The method according to claim 1, wherein the speed by which the fragmented material is transported from the material inlet to the material outlet is adjusted by at least one of the following measures:

a) adjusting frequency of the vibrations;

b) adjusting amplitude of the vibrations; and c) adjusting incline of the liquid bath with respect to a horizontal plane being perpendicular to gravity force.

4. The method according to claim 3, wherein the speed is controlled based on the temperature of the fragmented material exiting the liquid bath at the material outlet or the temperature of the grinded material when exiting the mill as a control variable.

5. The method according to claim 3, wherein the speed is controlled based on the temperature in the chute.

6. The method according to claim 1, wherein the fragmented material is provided to the liquid bath by a dosing means and a star valve.

7. The method according to claim 1, wherein evaporated liquid nitrogen is sucked off from the chute.

8. An installation for grinding fragmented material, comprising:

a liquid bath being providable with liquid nitrogen, the liquid bath having a material inlet at a first end through which fragmented material is providable into the liquid bath and a material outlet at a second end opposite the first end through which fragmented material exits;

an ultrasonic resonator connected to the bath such that ultrasonic vibration excitation of fragmented material within the liquid bath transports the material from the material inlet of the liquid bath to the material outlet of the liquid bath; and a chute directly connecting the material outlet of the liquid bath to a mill for grinding the fragmented material.

9. The installation according to claim 8, further comprising a control device by which at least one of the following parameters is adjustable:

a) excitation frequency of the mechanical excitation means;

b) excitation amplitude of the mechanical excitation means; and c) incline of the liquid bath with respect to a horizontal plane being perpendicular to the gravity force.

10. The installation according to claim 9, further comprising at least one of the following sensors:

a) a first temperature sensor measuring the temperature in the chute; and b) a second temperature sensor measuring the temperature in an exit zone of the mill, wherein the at least one temperature sensor is connected to the control device.

11. The installation according to claim 8, further comprising a dosing system and a star valve by which predeterminable amounts of fragmented material are providable to the liquid bath.

* * * * *